US011099307B2

(12) United States Patent
Chakmakjian et al.

(10) Patent No.: US 11,099,307 B2
(45) Date of Patent: Aug. 24, 2021

(54) OPTICAL SYSTEM

(71) Applicant: VIAVI SOLUTIONS INC., San Jose, CA (US)

(72) Inventors: Stephen H. Chakmakjian, Fort Collins, CO (US); George Michael Morris, Victor, NY (US); Bradley John Ward, Pittsford, NY (US); Tasso R. M. Sales, Rochester, NY (US)

(73) Assignee: VIAVI SOLUTIONS INC., San Jose, CA (US)

( * ) Notice: Subject to any disclaimer, the term of this patent is extended or adjusted under 35 U.S.C. 154(b) by 134 days.

(21) Appl. No.: 16/219,278

(22) Filed: Dec. 13, 2018

(65) Prior Publication Data

US 2019/0187341 A1 Jun. 20, 2019

Related U.S. Application Data

(60) Provisional application No. 62/599,015, filed on Dec. 14, 2017.

(51) Int. Cl.
*G02B 5/02* (2006.01)
*G02B 13/20* (2006.01)
(Continued)

(52) U.S. Cl.
CPC ........... *G02B 5/021* (2013.01); *G02B 3/0037* (2013.01); *G02B 3/0068* (2013.01);
(Continued)

(58) Field of Classification Search
CPC ...... G02B 5/021; G02B 5/045; G02B 5/0215; G02B 5/0231; G02B 5/0252; G02B 5/0257; G02B 5/0278; G02B 5/124; G02B 3/005; G02B 3/0068; G02B 3/0037; G02B 3/0043; G02B 3/08; G02B 6/0053; G02B 6/0065; G02B 30/27; G02B 27/0927; G02B 27/0944; G02B 27/0955; G02B 27/0961; G02B 1/14; G02F 1/133504; G02F 1/133606; F21V 5/007; F21V 5/02; B42D 25/29; B42D 25/43; B42D 25/324; B42D 25/328; B42D 25/342; B42D 25/425; B42D 25/355; B42D 25/387; B42D 25/391; H05K 3/0014

See application file for complete search history.

(56) References Cited

U.S. PATENT DOCUMENTS 5,183,597 A * 2/1993 Lu ........................... B29C 35/08
264/1.38
6,091,537 A 7/2000 Sun et al.
(Continued)

FOREIGN PATENT DOCUMENTS

JP 2011-504610 2/2011
JP 5527969 B2 6/2014
(Continued)

*Primary Examiner* — Mustak Choudhury
(74) *Attorney, Agent, or Firm* — Mannava & Kang, P.C.

(57) ABSTRACT

An optical system including a first microstructured surface; and a second microstructured surface; wherein the first microstructured surface is aligned along an axis with the second microstructured surface is provided. An illumination system including a light source and the optical system is also included. A method of diffusing light is included.

19 Claims, 5 Drawing Sheets

(51) Int. Cl.
  *G02B 3/00*     (2006.01)
  *G02B 27/09*    (2006.01)
  *G02B 1/14*     (2015.01)

(52) U.S. Cl.
  CPC ......... *G02B 5/0215* (2013.01); *G02B 5/0231* (2013.01); *G02B 5/0252* (2013.01); *G02B 5/0278* (2013.01); *G02B 27/0944* (2013.01); *G02B 27/0955* (2013.01); *G02B 1/14* (2015.01)

(56) References Cited

U.S. PATENT DOCUMENTS

| | | |
|---|---|---|
| 6,747,806 B2 | 6/2004 | Gelbart |
| 6,888,871 B1 | 5/2005 | Zhang et al. |
| 2009/0041448 A1* | 2/2009 | Georgiev ............... H04N 5/225 396/268 |
| 2013/0135515 A1* | 5/2013 | Abolfadl ............. H04N 5/2254 348/340 |
| 2013/0154250 A1* | 6/2013 | Dunn ..................... G02B 5/128 283/67 |
| 2015/0268390 A1* | 9/2015 | Teng ...................... G02B 5/045 359/834 |
| 2016/0164261 A1 | 6/2016 | Warren |

FOREIGN PATENT DOCUMENTS

| | | |
|---|---|---|
| JP | 2015-520407 | 7/2015 |
| JP | 2016-537666 | 12/2016 |
| JP | 2017-520789 | 7/2017 |
| JP | 2020-532141 | 11/2020 |

\* cited by examiner

OPTICAL SYSTEM

FIELD OF THE INVENTION

The present invention relates to an optical system including a first microstructured surface; and a second microstructured surface; wherein the first microstructured surface is aligned along an axis with the second microstructured surface. An illumination system including a light source and the optical system is also included. A method of diffusing light is included.

BACKGROUND OF THE INVENTION

In applications related to three-dimensional (3D) imaging, sensing, and gesture recognition, optical components are typically used to project a pattern of light over a scene being probed, typically in association with lasers with a wavelength in the range of from about 800 nm to about 1000 nm. The particular light pattern depends on the probing technique and can take various forms such as flood illumination, periodic grid of spots, lines, stripes, checkerboards, etc.

Diffusers can take a variety of forms such as diffractive diffusers, and Gaussian diffusers. Microlens arrays can also be utilized for diffusion purposes.

Diffusers can work with a variety of light sources, such as lasers or LEDs. A laser source of particular interest is a vertical cavity surface emitting laser (VCSEL). These VCSEL sources are useful for 3D imaging applications due to their suitability in compact packages, power output, and reliability. Such VCSELs may be arranged in an array, for example, several hundred are arranged over a small area on a periodic or randomized grid. Each laser within the array behaves substantially coherently but any given two sources are substantially incoherent with each other. VCSEL sources or arrays by themselves are not suitable for producing controlled illumination required in 3D imaging and sensing applications.

However, the problem with the use of a diffuser with a VCSEL array is the appearance of high-frequency artifacts. High-frequency artifacts in the projected illumination pattern can cause issues with performance in certain optical application, such as 3D sensing. These high-frequency artifacts are due to the incoherent overlap of the multiplicity of coherent VCSEL sources in the array being in close proximity.

The origin of the high-frequency artifacts can be better understood with the following line of reasoning. Each individual source in an array of light sources illuminates a portion of a diffuser. For this reason, there is an overlap between the areas of the diffuser illuminated by two adjacent light sources in an array. The output of each light source is characterized by a speckle pattern or strong diffraction pattern. Because any two sources in the array are mutually incoherent, the total output is given simply by the summation of the intensity patterns from each source. The accumulated effect of many such similar speckle or diffraction patterns gives rise to the emergence of the high-frequency image artifacts.

SUMMARY OF THE INVENTION

In an aspect of the invention, there is disclosed an optical system comprising: a first microstructured surface; and a second microstructured surface; wherein the first microstructured surface is aligned along an axis with the second microstructured surface.

In another aspect of the invention, there is disclosed an illumination system comprising a light source and the optical system.

In another aspect of the invention, there is disclosed a method of diffusing light, comprising: receiving incident light in a first microstructured surface of an optical system; and transmitting light from a second microstructured surface of an optical system; wherein the transmitted light exhibits minimal high-frequency artifacts as compared to an optical system including only a single microstructured surface.

BRIEF DESCRIPTION OF THE DRAWINGS

The foregoing objects, features and advantages of the invention will become more apparent from a reading of the following description in connection with the accompanying drawings in which.

Figure 1:
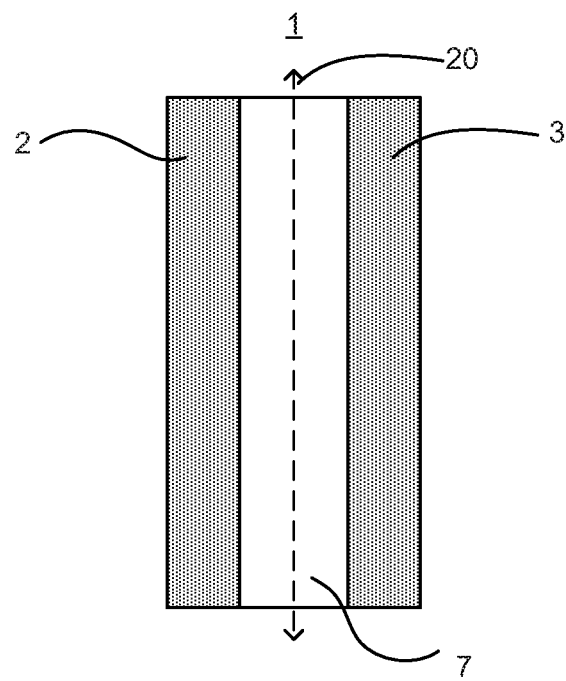
FIG. 1 is a cross-sectional view of an optical system according to the present invention.

The foregoing drawings, which are incorporated in and constitute part of the specification, illustrate the preferred embodiments of the invention, and together with the detailed description, serve to explain the principles of the invention. It is understood, evidently, that both the drawing and the description are explanatory only and are not restrictive of the invention.

DETAILED DESCRIPTION OF THE INVENTION

It is to be understood that both the foregoing general description and the following detailed description are exemplary and explanatory only, and are intended to provide an explanation of various embodiments of the present teachings.

Referring to FIG. 1, the present invention relates to an optical system 1 including a first microstructured surface 2, and a second microstructured surface 3, wherein the first microstructured surface 2 is aligned along an axis 20 with the second microstructured surface. The optical system 1 can also include a support 7. When the first microstructured surface 2 is aligned with the second microstructured surface 3 they are substantially parallel to one another. In another aspect, the first microstructured surface 2 is not aligned along an axis with the second microstructured surface 3.

There is disclosed an optical system 1 for diffusing illumination from a light source, such as a single light source or an array of light sources. The disclosed optical system 1 can minimize high-frequency artifacts and provide more uniform illumination while minimally affecting total transmission. The optical system 1 can include a first microstructured surface 2, such as a beam shaping surface, that distributes an illumination from a light source into a pattern. The optical system can also include a second microstructured surface 3, such as a homogenizing surface, that receives the pattern and concentrates the pattern.

The concept of field of view (FOV) refers to a region of space that is being effectively illuminated by the optical system 1. FOV is most often defined in angular space with respect to an intensity and measured with a goniometer system, in which a detector scans along a circle with the optical system 1 located at its center. In this manner, the detector rotates along an arc always facing towards the optical system 1. Other approaches to defining the FOV can also be considered, for instance, based on irradiance instead of intensity. In this manner, the light source illuminates the optical system 1, which then illuminates a flat target surface. Irradiance is measured with a detector running parallel to the surface. In practice, one typically uses a transmissive screen, whose image is captured by a camera. Proper system calibration can be used to calculate irradiance and characterize the FOV of the optical system.

The first microstructured surface 1 can provide a first field of view (FOV) defined by the angular extent of the illumination, the intensity profile, and the geometry of the microstructures in the first microstructured surface 2. The angular extent of illumination can be projected along two-dimensions. For example, the first FOV can have an angular extent of 120 degrees along the y dimension, and 90 degrees in the x dimension, which would illuminate a rectangular region of space. In a 3D sensing application, the first FOV can have an angular extent on the order of 30 degrees or larger along any one dimension. In a LIDAR application, the first FOV can have an angular extent on the order of 1 degree or larger along any one dimension.

The intensity profile of an image, such as the first FOV, is the set of intensity values taken from regularly spaced points along an angular segment. In an aspect, the intensity profile within the first FOV is substantially uniform as a function of angle. In another aspect, the intensity profile within the first FOV concentrates more energy towards wider angles in a so-called "batwing" profile. In another aspect, the intensity profile within the first FOV concentrates more energy at the center of the first FOV.

The second microstructured surface 3 can have a second field of view narrower than the first field of view in order to remove or minimize (substantially remove) high-frequency artifacts. The second FOV can be about 3 to 15 times narrower than the first FOV, although the exact value depends on other requirements and would need to be optimized for best performance. Such optimization can be carried out either by modeling tools or direct experimentation. As an example, the first microstructured surface 2 can have a FOV of about 110×85 degrees, and the second microstructured surface 3 can have a FOV somewhere in the range of about 5 to about 15 degrees.

The intensity profile of the second microstructured surface 3 can be generally isotropic with substantially the same intensity profile along any direction. In another aspect, the second microstructured surface 3, by itself, can produce an anamorphic pattern where the second FOV along two perpendicular axis are different. The second microstructured surface 3 can also produce patterns such as a circle, a square, a rectangle, lines, cross patterns, spot arrays or any particular scatter distribution with the basic constraint being that the second FOV is narrower than the first FOV. The intensity profile along a given axis can be flat-top, batwing, Gaussian, or any other particular intensity profile. Along a perpendicular axis the intensity profile may be distinct or not from the profile along the given axis.

Figure 9:
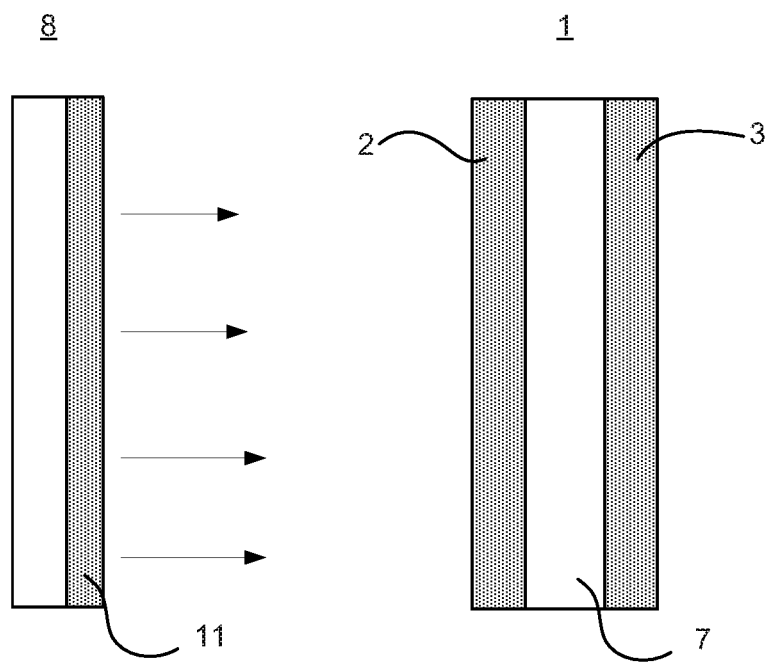
FIG. 9 is a schematic of an illumination system including a light source and the optical system.

In an aspect, the optical system 1 can include two oppositely oriented microstructured surfaces. In an aspect, as illustrated in FIG. 1, the optical system 1 can include a first microstructured surface 2 on one side of the support 7 and a second microstructured surface 3 on the opposite side of the support 7. Each microstructured surface 2, 3 can contain a plurality of microstructures that can form a pattern. The first microstructured surface 2 can face toward a light source. The second microstructured surface 3 can face away from a light source 8, for example, as illustrated in FIG. 9.

Figure 5:
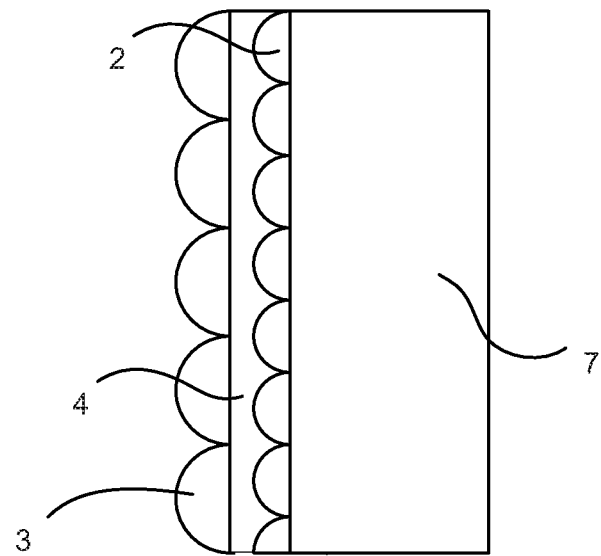
FIG. 5 is a schematic of an optical system according to another aspect of the present invention.

In another aspect, the optical system 1 can include a first microstructured surface 2 and a second microstructured surface 3 each oriented in the same direction and located on a same side of a support 7 of the optical system 1. For example, as illustrated in FIG. 5, the first microstructured surface 2 and the second microstructured surface 3 can both be present on a same side of the support 7. The first microstructured surface 2 can be positioned between the second microstructured surface 3 and the support 7. In another aspect, the second microstructured surface 3 can be positioned between the first microstructured surface 2 and the support 7 (not shown). In either variation, a light source can be present on either the support 7 side or the microstructured surface side.

The first microstructured surface 2 can include a first plurality of microstructures. The second microstructured surface 3 can include a second plurality of microstructures. The first and the second microstructured surfaces 2, 3 each independently include a microstructure, such as a microlens diffuser, a saddle lens diffuser, a diffractive element, a Gaussian diffuser such as ground glass, or a holographic diffuser.

Figure 2:
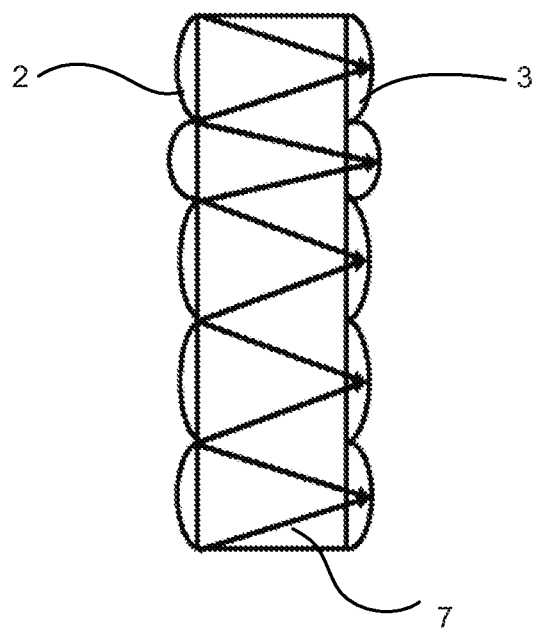
FIG. 2 is a schematic of an optical system according to another aspect of the present invention.

Referring to FIG. 2, the first microstructured surface 2 can be aligned along an axis with the second microstructured surface 3. In an aspect, each microstructure of the first plurality of microstructures can focus a substantial fraction of incident light across an aperture of the microstructure at the second microstructured surface 3. The second microstructured surface 3 can be a mirror image of the first microstructured surface 2. This particular arrangement is typically referred to as a "fly's eye" lens.

The size of individual microstructures, such as a microlens, in an array, can be in the range of from about 10 to about 100 µm.

The microstructures of the second microstructured surface 3 can be comparable in size and shape, or smaller, to those of the first microstructured surface 2. The microstructures in each of the first microstructured surface 2 and the second microstructured surface 3 can be distributed in a periodic array or randomly distributed. For example, the first microstructured surface 2 and the second microstructured surface 3 can each independently be an array of microlens.

Figures 3A, 3B, 3C:
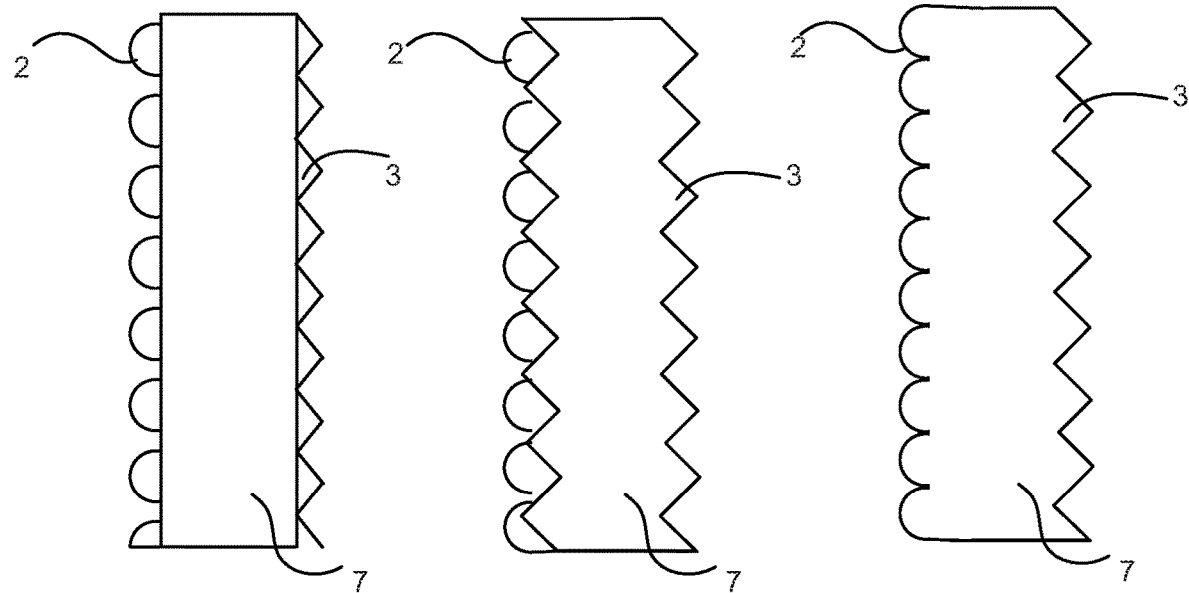
FIGS. 3A-C are each a schematic of an optical system according to another aspect of the present invention.

Referring to FIGS. 3A-C, the optical system 1 can include the first microstructured surface 2, the second microstructured surface 3, and a support 7 each of which can independently be formed of an optical material. Non-limiting examples of the optical material include glass, such as Borofloat; a polymeric material, such as UV-curable polymers, molded polymers, or embossed polymers; fused silica; IR materials, such as silicon; amorphous silicon; and combinations thereof. The polymeric material can be polycarbonate or acrylics, for example. The optical material can be a high refractive index material, such as a material having a refractive index greater than 1.5.

With regard to FIG. 3A, the first microstructured surface 2 can be formed of a polymeric material and includes a plurality of microlens diffusers as the microstructure. The support 7 can be made of an a Borosilicate glass. The second microstructured surface 3 can include a plurality of microstructures of ground glass directly formed onto the support material 7.

With regard to FIG. 3B, the first microstructured surface 2 can be formed of a polymeric material and includes a plurality of microstructures of microlens diffusers and ground glass. The support 7 can be made of a Borosilicate glass. The second microstructured surface 3 can include a plurality of microstructures of ground glass formed on the support material 7.

With regard to FIG. 3C, there is a first microstructured surface 2, a support 7, and a second microstructured surface 3, all formed of the same material as it might be formed, for example, by hot embossing or molding processes.

Figure 6:
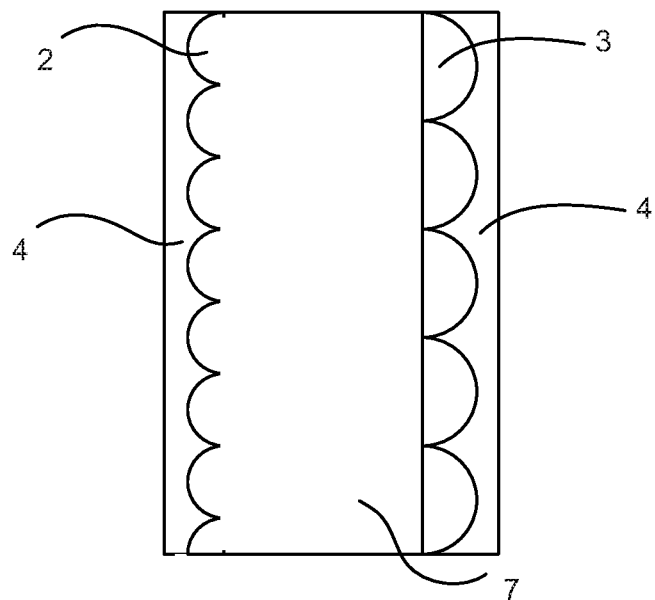
FIG. 6 is a schematic of an optical system according to another aspect of the present invention.
Figure 7:
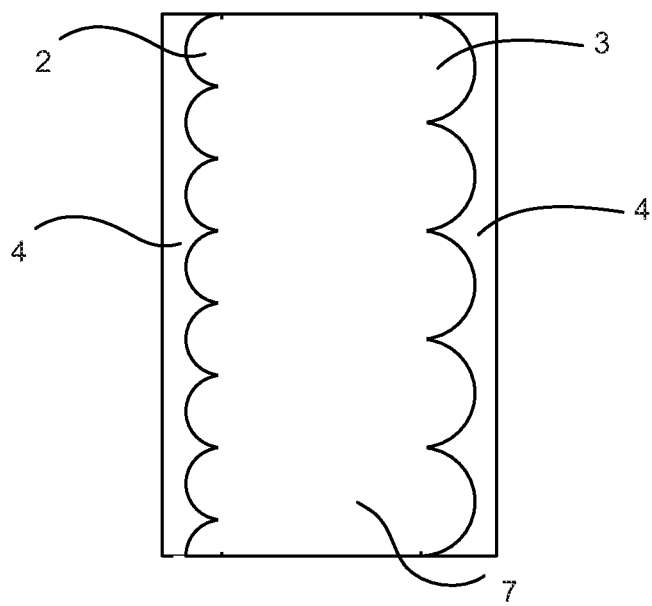
FIG. 7 is a schematic of an optical system according to another aspect of the present invention.

In an aspect, the optical system 1 can be formed of a single optical material. In another aspect, the optical system 1 can be formed of different materials. For example, the first microstructured surface 2 and the second microstructured surface 3 can each be made of a polymeric material and the support 7 may be made of a glass material. As shown in FIG. 6, the first microstructured surface 2 and the support 7 are formed of the same optical material, i.e., are a monolith. As shown in FIG. 7, the first microstructured surface 2, the support 7, and the second microstructured surface 3 are formed of the same optical material. Any and all combinations of parts of the optical system 1 and optical materials are acceptable so long as the optical system 1 includes a first microstructured surface 2, and a second microstructured surface 3.

The total thickness of the optical system 1 can be in the range of from about 0.1 mm to about 2 mm, depending on the packaging requirements and the materials being utilized. As an example, the support 7 can be a Borosilicate glass with a thickness of about 0.3 mm while the microstructures on either side can be composed of polymeric materials produced by a UV curing process having a thickness in the range of about 20 μm to about 120 μm, thereby resulting in a total thickness in the range of about 0.34 mm to about 0.54 mm. In another example, at least one microstructured surface 2, 3, can include amorphous Silicon, thereby resulting in total thickness in the range of about 0.32 mm to about 0.44 mm because the amorphous Silicon material allows for thinner layers due to its high index of refraction.

The first microstructured surface 2 can have a thickness ranging from about 0.5 microns to about 120 microns, for example from about 0.75 microns to about 100 microns, and as a further example from about 1 micron to about 90 microns, depending on materials, microstructure design, and fabrication process. The thickness can include a base portion (a planar portion) and a portion that is microstructured.

The support 7 can have a thickness in the range from about 0.02 mm to about 2 mm, from example from about 0.05 mm to about 1.6 mm, and as a further example from about 0.1 mm to about 1.8 mm.

The second microstructured surface 3 can have a thickness ranging from about 0.5 microns to about 120 microns for example from about 0.75 microns to about 100 microns, and as a further example from about 1 micron to about 90 microns, depending on materials, microstructure design, and fabrication process. The thickness includes a base portion (a planar portion) and a portion that is microstructured.

Figure 4A:
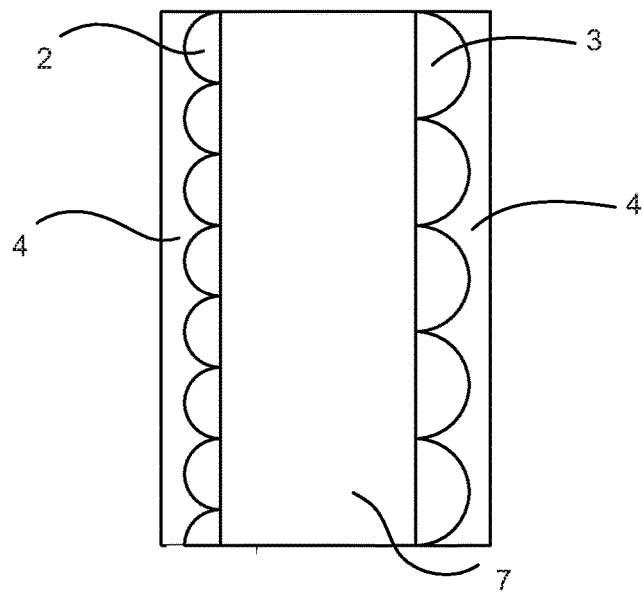
FIG. 4A-B are each a schematic of an optical system according to another aspect of the present invention.
Figure 4B:
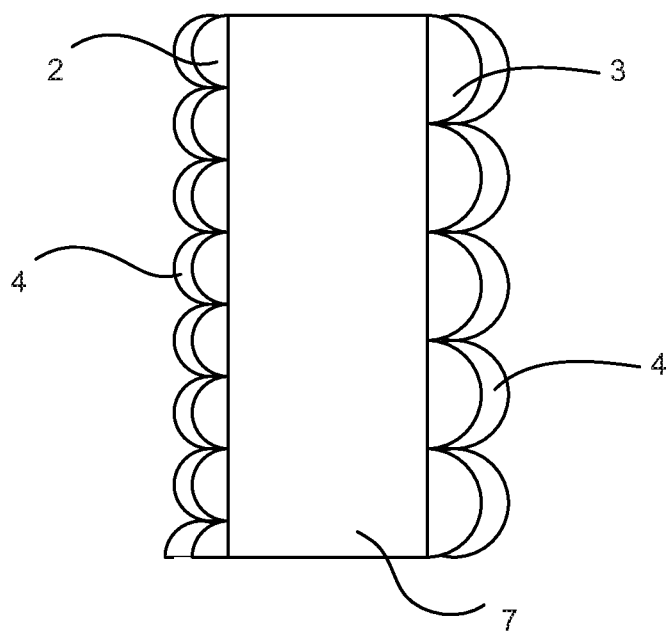

The optical system 1 of present invention can take various physical formats. As shown in FIG. 4A, the optical system 1 can further include an embedding layer 4. An embedding layer 4 can be present on at least one of the first microstructured surface 2 and the second microstructured surface 3. The embedding layer 4 can be planar, as shown in FIG. 4A. A planar embedding layer 4 can enable smaller packaging of the optical system 1. In an aspect, the embedding layer 4 can be conforming, i.e., can conform to the microstructures of the microstructure surface, as shown in FIG. 4B. A conforming embedding layer 4 can provide increased durability of the optical system 1. The optical system 1 can include a planar embedding layer 4, a conforming embedding layer, and combinations thereof. In an aspect, the optical system 1 can include one embedding layer, two embedding layers, etc. Any and all permutations of numbers, types, and materials for the embedding layer is contemplated. The embedding layer 4 can have a thickness in the range of from about 1 to about 100 microns.

The embedding layer 4 can protect the first and/or second microstructured surfaces 2, 3 as well as prevent contamination that might lead to index matching of the microstructured surface. Index matching occurs when some material, such as a fluid, covers the microstructured surfaces 2, 3, and prevents the microstructured surfaces 2, 3 from operating correctly. Non-limiting examples of material suitable for use as an embedding layer include polymers, fused silica, and amorphous silicon.

The embedding layer 4 can also be anti-reflective coating to reduce surface reflections and increase transmission of light. In an aspect, the embedding layer 4 is a single layer. In another aspect, the embedding layer 4 is at least one layer, such as a plurality of layers. If more than embedding layer 4 is present in an optical system 1, then each embedding layer 4 can include the same or different material.

Figure 8:
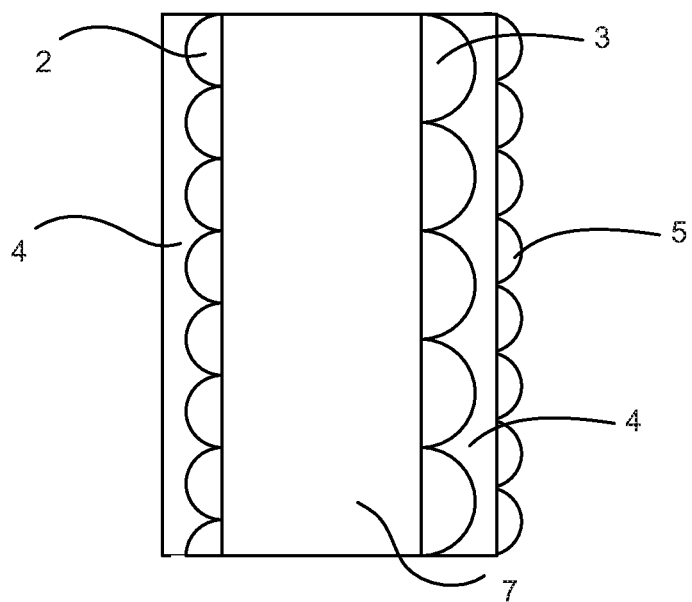
FIG. 8 is a schematic of an optical system according to another aspect of the present invention.

Referring to FIG. 8, the first microstructured surface 2 is embedded in a planar, embedding layer 4. The second microstructured surface 3 is embedding in a planar, embedding layer 4, with a conforming, protective layer 5, such as an anti-reflective layer. The protective layer 5 can be formed of materials such as $TiO_2$, $SiO_2$, $MgF_2$, ITO, $CaF_2$.

In an aspect, the optical system 1 can include more than one microstructured surface 2, 3 on each side of the support 7. For example, the optical system can include a second microstructured surface 3, and a first microstructured surface 2 on a side of the support 7 receiving illumination from a light source; and can include an additional first microstructured surface 2 and an additional second microstructured surface 3 on a side of the support 7 transmitting light. The optical system 1 can include any combination of microstructured surfaces 2, 3 on either side of the support 7. Additionally, the optical system 1 can include any combination of embedding layer 4 (planar and/or conforming) on either side of the support 7.

The optical system 1 can be formed using techniques, such as molding, etching, grinding, grey-scale lithography, etc. The technique used to form the optical system can depend, in part, on the FOV, the optical materials, the type of expected light source, etc.

Referring to FIG. 9, there is further disclosed an illumination system 10 including the disclosed optical system 1 and a light source 8. The light source 8 can be an array of light sources 11, wherein each source within the array is substantially coherent, but any two sources in the array are substantially incoherent with each other. An example is a vertical-cavity surface-emitting laser (VCSEL) array. There is considerable flexibility in the placement of the individual sources within the array, generally periodic but also random or pseudo-random. Each light source in the array can be coherent with a beam divergence that may be about 10 to about 30 degrees full-width at 1/e².

In another aspect, the light source 8 can be a single light source, such as a laser.

The illumination system 10 can be compact and suitable to be incorporated into small volumes as are typical of consumer-type devices and other small-format package products. Applications for the illumination system 10 may be three-dimensional (3D) imaging, depth sensing, gesture recognition, automotive, cellular communication devices, machine vision, and LIDAR amongst many others.

There is also disclosed a method of diffusing light, comprising: receiving incident light in a first microstructured surface 2 of an optical system 1; and transmitting light from a second microstructured surface 3 of an optical system 1; wherein the transmitted light exhibits minimal high-frequency artifacts as compared to an optical system including only a single microstructured surface. In particular, the method can include providing a light source that transmits incident light. A first microstructured surface 2 of an optical system 1 can received the incident light and can transmit the received incident light in the form of a light pattern towards the second microstructured surface 3 of the optical system 1. The second microstructured surface 3 can receive the transmitted light pattern, can homogenize the transmitted light pattern, and transmit a homogenized transmitted light pattern that exhibits minimal high-frequency artifacts.

Although this method has been described with respect to an optical system as shown in FIG. 1, the method can be performed with any of the optical systems 1 disclosed in the Figures wherein a light source can be placed on either side of the optical system 1 and the transmitted light pattern will exhibit minimal high-frequency artifacts as compared to an optical system including only a single microstructured surface.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This disclosure is to be broadly construed. It is intended that this disclosure disclose equivalents, means, systems and methods to achieve the devices, activities and mechanical actions disclosed herein. For each composition, device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a composition and its many aspects, features and elements. Such a composition can be dynamic in its use and operation, this disclosure is intended to encompass the equivalents, means, systems and methods of the use of the composition and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An optical system comprising:
a first microstructured surface for receiving incident light; and
a second microstructured surface for transmitting the received incident light in a homogenized light pattern;
wherein the first microstructured surface is aligned along an axis with the second microstructured surface; and
wherein the first microstructured surface has a first field of view and the second microstructured surface has a second field of view that is narrower than the first field of view.

2. The optical system of claim 1, wherein the first microstructured surface includes a first plurality of microstructures.

3. The optical system of claim 1, wherein the second microstructured surface includes a second plurality of microstructures.

4. The optical system of claim 1, wherein the first and second microstructured surfaces each independently include a microstructure of a microlens, a saddle lens, a diffractive element, a Gaussian diffuser, or a holographic diffuser.

5. The optical system of claim 1, wherein the first and second microstructured surfaces are each independently formed of an optical material.

6. The optical system of claim 1, wherein the second microstructured surface is a mirror image of the first microstructured surface.

7. The optical system of claim 1, further comprising a support.

8. The optical system of claim 7, wherein the first microstructured surface is on one side of the support and the second microstructured surface is on an opposite side of the support.

9. The optical system of claim 7, wherein the first microstructured surface and the second microstructured surface are on a same side of the support.

10. The optical system of claim 9, wherein the first microstructured surface is positioned between the second microstructured surface and the support.

11. The optical system of claim 9, wherein the second microstructured surface is positioned between the first microstructured surface and the support.

12. The optical system of claim 1, wherein the first microstructured surface has a first field of view has an angular extent of 30 degrees or larger.

13. The optical system of claim 1, wherein the first and second microstructured surfaces are each independently an array of microlens.

14. The optical system of claim 1, further comprising an embedding layer on at least one of the first microstructured surface and the second microstructured surface.

15. The optical system of claim 14, wherein the embedding layer is planar.

16. The optical system of claim 14, wherein the embedding layer is conforming.

17. The optical system of claim 1, further comprising a protective layer.

18. An illumination system comprising a light source and the optical system of claim 1.

19. A method of diffusing light, comprising: receiving incident light in a first microstructured surface of an optical system; and transmitting the received incident light in a form of a light pattern to a second microstructured surface; receiving the transmitted light pattern in the second microstructure surface; and transmitting a homogenized light pattern from the second microstructured surface of the optical system; wherein the transmitted light pattern exhibits minimal high-frequency artifacts as compared to an optical system including only a single microstructured surface; and wherein the first microstructured surface has a first field of view and the second microstructured surface has a second field of view that is narrower than the first field of view.

\* \* \* \* \*